US006647308B1

(12) United States Patent
Prejean

(10) Patent No.: US 6,647,308 B1
(45) Date of Patent: Nov. 11, 2003

(54) KEY MANUFACTURING METHOD

(76) Inventor: Ronald Martin Prejean, 7138 Owensmouth Ave., Canoga Park, CA (US) 91303

( * ) Notice: Subject to any disclaimer, the term of this patent is extended or adjusted under 35 U.S.C. 154(b) by 294 days.

(21) Appl. No.: 09/663,859

(22) Filed: Sep. 15, 2000

Related U.S. Application Data

(63) Continuation-in-part of application No. 09/417,531, filed on Oct. 13, 1999, which is a continuation-in-part of application No. 08/902,303, filed on Jul. 29, 1997, now abandoned.

(51) Int. Cl.[7] .............................................. G06F 19/00
(52) U.S. Cl. ....................... 700/117; 700/120; 264/219
(58) Field of Search ................................. 700/161, 163, 700/195, 119, 120, 117, 97; 409/132, 83; 264/219

(56) References Cited

U.S. PATENT DOCUMENTS

| 3,826,555 | A |   | 7/1974  | Matsumoto ................... 359/1    |
| 4,899,391 | A | * | 2/1990  | Cimino et al. .............. 382/100   |
| 5,130,064 | A |   | 7/1992  | Smalley ...................... 264/401  |
| 5,192,469 | A |   | 3/1993  | Smalley ...................... 264/401  |
| 5,503,785 | A | * | 4/1996  | Crump et al. .............. 264/40.7    |
| 5,515,903 | A | * | 5/1996  | Hronas et al. ................ 164/45   |
| 5,545,367 | A |   | 8/1996  | Bae ............................ 264/401 |
| 5,555,176 | A |   | 9/1996  | Menhennett et al. ....... 700/118       |
| 5,594,652 | A | * | 1/1997  | Penn et al. .................. 700/119  |
| 5,855,836 | A | * | 1/1999  | Leyden et al. .............. 264/401    |
| 5,997,795 | A | * | 12/1999 | Danforth et al. ............ 246/100    |
| 6,064,747 | A | * | 5/2000  | Wills et al. .................. 382/100  |
| 6,185,311 | B1 | * | 2/2001  | Yanovsky et al. .......... 382/100     |
| 6,406,227 | B1 | * | 6/2002  | Titus et al. ................. 700/161  |

OTHER PUBLICATIONS

A set of Cyberware Technical Briefs entitled "Rapid 3D Digitizer Model 15" (Oct. 1, 1999), 12 pages.
Cyberware, "Whole Body Scanner Model WB4," http://www.cyberware.com, Cyberware (Monterey, California), p. 14, (Oct. 13, 1998).
Laser Design, Inc., "Surveyor 1200," www.laserdesign.com, Laser Design, Inc. (Minneapolis, Minnesota), p. 14, (Oct. 12, 1998).

* cited by examiner

Primary Examiner—Leo Picard
Assistant Examiner—Bahta Kidest
(74) Attorney, Agent, or Firm—Kelly Bauersfeld Lowry & Kelley, LLP

(57) ABSTRACT

A method of making duplicate keys employs the use of a scanning device for capturing the physical profile of a master key or alternately, formulating the profile as a data construct without the use of a master key. This data construct can be assigned a unique code and stored on a database for later retrieval. Once the key profile has been captured or formulated in a data base memory device, a key may be fabricated without the need for traditional key blanks in accordance with the profile data by, for example, a three-dimensional modeling device such as a fused deposition modeling device or stereolithographic device. Alternately, a milling device or high energy beam in conjunction with a metal slug can construct the duplicate key, or an injection molder using high density molding resin can be used to construct the duplicate key.

21 Claims, 1 Drawing Sheet

KEY MANUFACTURING METHOD

RELATED APPLICATIONS

This application is a continuation-in-part of U.S. patent application Ser. No. 09/417,531, filed Oct. 13, 1999, which is a continuation-in-part of U.S. patent application Ser. No. 08/902,303, filed Jul. 29, 1997 and now abandoned.

BACKGROUND OF THE INVENTION

1. Field of the Invention

This invention relates generally to key duplicating processes, and more particularly is directed to a method for fabricating duplicate keys without a master key, and to a method for such fabrication that is compatible with automatic key making such that special key blanks and trained personnel are not necessary to the key making process.

2. Description of Related Art

The following art defines the present state of this field:

U.S. Pat. No. 3,796,130 (Gartner) describes an unattended semi-automatic, coin operated duplicate key vending machine for use by members of the general public, the machine having a supply of key blade blanks with different cross sectional shapes in storage. A customer may quickly select the correct blank by placing his key into one of a plurality of slots or selector openings. Each of the slots is adapted to receive a key blade of a different shape which cross section corresponds to the shape of one of the blanks in storage.

U.S. Pat. No. 4,062,261 (Stahl) describes a key cutting apparatus for cutting a series of longitudinally spaced notches in the blade of a key blank according to specifications set forth in key manufacturers' codebooks. The apparatus includes a cutter mounted on a base, and a carriage assembly movably mounted on the base for controllable movement toward and away from the cutter. The carriage assembly includes a sub-carriage adapted for controllable independent movement in a direction perpendicular to the carriage assembly movement.

U.S. Pat. No. 4,117,763 (Uyeda) describes a method and apparatus for decoding and duplicating a key wherein the notches in the shank of the key are coded to a predetermined coded depth and spacing. An index card having a sequential index thereon corresponding to the predetermined coded depth is inserted into a housing and the key to be duplicated is inserted into, a slot in the housing where it engages an indexing member which enters one of the notches on the key and indicates on the card the coded depth of that notch.

U.S. Pat. No. 4,143,582 (Heimann) describes a small and simply operated recording apparatus employing an elastic pressure element that is utilized to make a three dimensional recording in thin metallic foil from each of the two sides of a primary key from which a secondary key is to be manufactured, the recordings placed in an interpreting apparatus, which may be located remotely from the recording apparatus, which permits extraction of precise three dimensional data stored in the recordings whereafter the extracted data is utilized in a key cutting apparatus to produce a secondary key, in all comprising a key making system.

U.S. Pat. No. 4,251,173 (Saucedo) describes a key cutter that includes a machine for cutting keys for most pin tumbler or disc tumbler locks. The machine is not a duplicator but is a machine for cutting keys by the code or number. The machine includes base, turret assembly, and an electric motor for operating or driving a cutting wheel.

U.S. Pat. No. 4,526,498 (Fieldhouse) describes a key forming machine that includes a machine frame, key cutting means mounted on the machine frame and operable to cut bittings at preselected locations and depths into a key blank to form a key, and a carriage assembly adapted to carry a key blank and mounted on the machine frame for movement for presentation of the key blank to the key cutting means. First and second indexing mechanisms are mounted on the machine frame and are operable to move the carriage assembly, for presentation of a carried key blank to the key cutting means, to indexed positions respectively corresponding to preselected biting locations and bitting depths.

U.S. Pat. No. 4,657,448 (Alexander) describes a pantograph angular bitted key cutting machine which facilitates the replication of angular bitted keys, commonly known as Medecod keys by automatically replicating the position, depth and angularity of each tooth. Accurate angularity, the most difficult of the variables to replicate, is assured by ensuring that the center of rotation of the angular tooth wall is perpendicular to the radius of the cutting head. Two major embodiments are provided. In the first, the cutting head and the guide that aligns with the original key are fixed in the same line. In the second embodiment the guide and the original key are placed directly behind the cutting head and the blank duplicate key.

U.S. Pat. No. 4,780,032 (Uyeda et al.) describes a key duplicating apparatus, which includes a base and platform supporting a reciprocating carriage assembly and a pivotally mounted housing. The carriage assembly has a key securement means which secures a blank key and a template key in alignment for positioning, respectively, with a notch cutting means and a notch depth indicating means, so that a template key may be duplicated by cutting notches of a predetermined depth and position into the shank portion of the blank key.

U.S. Pat. No. 5,042,330 (Lo) describes a key manufacturing method, which includes a first procedure to produce key bodies through material shape molding, side-edge cutting process, thickness, curvature and length milling process, bitting forming process, and numbering and classification process according to shape of bitting; a second procedure to produce sheaths through copper rod planing process, conical front end milling process, groove lathing process and opposite inner wall trimming process; and a third procedure to fixedly fasten a key body in a sheath to form a unitary round key.

U.S. Pat. No. 5,128,531 (Fadel) describes an optical profile reader, particularly for key duplicating machines, incorporating a photoemitter on one side of the profile to be read, and a photodetector facing the photoemitter, but on the opposite side of the profile to be read. Stepper motors are included for causing the profile to be read to move orthogonal to the direction of a light beam striking the profile to be read. An electronic circuit controlled by the output signal of the photodetector is also provided. The electronic circuit uses a threshold discriminator set at a value between the values corresponding to the maximum and minimum illumination states of the photodetector. The threshold discrimination circuit also controls the operations of the stepper motors.

U.S. Pat. No. 3,826,555 (Matsumoto) describes a holography device which is comprised of a beam splitter arranged in the optical path of an incident beam from a beam source, and beam splitter splitting said incident beam into at least three beams. At least one transmitted beam and at least two reflected beams, said transmitted beam and at least one of said reflected beams being used as an illuminating beam for the object and the other reflected beam being used as a reference beam, said object transferring its illuminating beam into a signal beam.

Conventional key duplicating machines are typically manually operated wherein a skilled technician is needed to set-up, operate, and guide a holding device to produce a working product. Such duplicating machines are designed so that the technician must have a prior knowledge, skill, and ability to select a specific key blank or stock as to match the master or original key to be-duplicated or copied.

Such devices (machines) are produced with specific instructions as to the degree of capabilities for its original intent. Some machines are solely designed to cut and duplicate only certain manufacturers' keys, as for example: Medeco, Abloy, Assa, Schlage Primus, with side milled, dimpled and grooved keys. Others are designed to only cut simple common keys such as Kwikset, Weslock, and Weiser generally used in household locks.

Such machines are temperamental requiring frequent adjustments and alignments caused by wear and tear from motor driven belts, worn key cutting blades, and key alignment guides, gauges and stops.

Also, the user must correctly and consistently install and align the original or master key and key blank in the holding apparatus of the key machine to insure correct calibration of depth and spacing when cutting proceeds. Not tightening the key holding apparatus properly also becomes a serious problem, since the key may move or be ejected by the cutting blade when contact is made and thereby cause a failure to duplicate.

Another problem occurs when the "stop" on the original key has been worn off, and there is no consistent way to align both the original key and the key blank on the holding apparatus of the key machine. Improper spacing of the cuts will occur causing improper function of the cut key.

Some prior key machines hold the original key to be cut by the actual grooves in the key blank. Special clamps and holders must be purchased for this procedure to be possible, causing a new set-up of th key machine to be necessary. Again, alignment and adjustments are required.

Fadel teaches an optical profile reader for a key-duplicating machine. Such a device, while well suited for automatically cutting a duplicate key without the use of a master in contact with the feeler, still requires the use of a key blank or stock supplied by the manufacturer. Thus reverting back to the problems of alignment, calibrations, human errors, spacing, worn key cutting blades, worn drive (motor) belts, lubrication of dovetail slides, set-up of key blanks in clamp holding apparatus, light infractions that may upset the balance of the optical reader giving false readings, and worn alignment stops on the original key, which would misalign the key blank to be duplicated. Some original keys, such as Ford vehicle keys, have no "stops" for alignment, which presents an initial alignment problem.

The prior art teaches methods for duplicating keys of all types including common flat blade keys as well as barrel keys comprising a hollow cylindrical shaft, bit keys (skeleton keys) and many new style designs having complex cross-sections such as modified tubular keys. However, key duplicating is still dominated by slow and skilled labor factors except for the most common key types which are at least semiautomated. Yet key configuration and size types have grown to now include a truly extensive number making it nearly impossible, to provide an inexpensive and quick solution for a full range key replication operation. The primary factors that drive both price and availability in this field are cost of inventory of a very large number of key blank types, and training of personnel in the art of blank selection and key duplication and finishing.

Simple solutions to a wider range of key cutting and less expensive key replication such as provided by Fadel with his two dimensional photodetection approach, and to automation, such as taught by Gartner with his key duplicating and vending machine suffer from two problems. First, these approaches are not universal because they only accommodate a limited number of key types in practice since standard key cutting methods are employed. Second, these methods require a master key to be used as a template in making a duplicate key.

Accordingly, there is a need for a novel key making process which duplicates, copies, clones, or makes from scratch, an exact required key conformation and which is less complex and more trouble free than present key manufacturing and duplication processes. Further, such a novel process could be made to store information, codes, key cuts, manufacturer data and specifications, and used at any time when needed. Duplicate keys could be made from data stored in memory to cut a first or duplicate key or even alter its specifications if desired. The present invention fulfills these needs and provides further related advantages.

SUMMARY OF THE INVENTION

The main objective of the present invention is to provide a key-manufacturing process that is easily automated so as to require little operational skill or knowledge, and requires no set-up and no key blanks.

Another objective of the present invention is to provide a method of making a duplicate key from a stored electronic representation of the contour of a master key.

Yet another objective is to provide such a method capable of producing a duplicate key when the master is physically unavailable.

A further objective is to provide a method which may be reduced to an inexpensive and fully automatic, rapid key replication procedure so as to enable low cost key replication without the necessity for a locksmith or other duplication machine operating personnel.

Still a further objective is to provide a process capable of using a database and a CAD-CAM or CIM system for manufacturing original keys by code.

The foregoing objectives are achieved by the present invention which provides a method for fabricating a duplicate key from a stored electrical representation of the three-dimensional contour of a master key, real or virtual. The inventive process uses an approach that is able to capture, as electronic signals, the conformation of any size and shape of all key types. Therefore when keys are initially produced, all that is necessary for their later replication is to download a copy of the electronic signals of the keys rather than the master key itself, which of course, may be lost or unavailable. The method further includes a means by which the electronic signals are used to make-up a duplicate key from a generalized raw material rather than from a key blank. This is accomplished through the use of three-dimensional scanners, CAD-CAM techniques, and a manufacturing device. This approach avoids the current requirement of a large inventory of key blanks, and the necessity of specialized operators, and overcomes the time and expense involved when a master key is lost.

The method for making a duplicate key from profile data associated with a master key generally comprises the following steps: first, capturing an exterior surface conformation of a master key as an electrical signal representation in three-dimensions; second, storing the electrical signal representation as a permanent data image; and third directing a key manufacturing device to construct a duplicate key from non-traditional key blank raw material using the stored electrical signal representation.

The method for capturing the exterior surface conformation of the master key may comprise an optical scanning method using a holographic camera, or a mechanical probe. The resulting electrical signal representation may be assigned a unique code and stored on a database for later retrieval.

Typically, a three-dimensional modeling device is utilized to construct the duplicate key. Such three-dimensional modeling devices can include a fused deposition modeling device which uses thermoplastic filament to construct the duplicate key or a stereolithographic device using stereolithographic fluid. Alternatively, a milling device or high energy beam can be used to construct a duplicate key from a metal slug. Further, an injection molder device using high density molding resin may be utilized to construct the duplicate key.

Other features and advantages of the present invention will become apparent from the following more detailed description, which illustrate, by way of example, the principles of the invention.

BRIEF DESCRIPTION OF THE DRAWING

The accompanying drawing illustrates the invention. In such drawing:

DETAILED DESCRIPTION OF THE PREFERRED EMBODIMENTS

Figure 1:
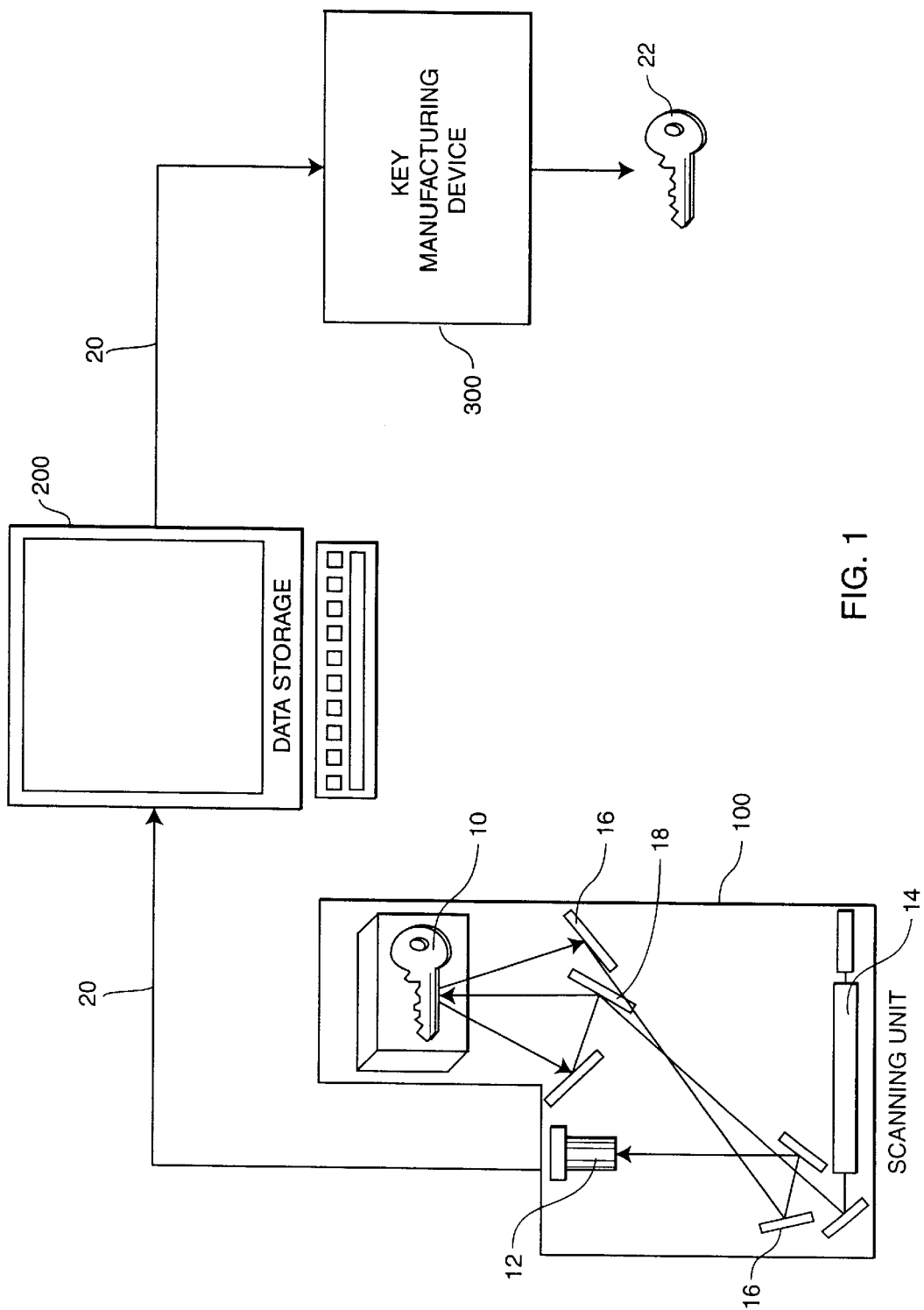
FIG. 1 is a functional block diagram of a preferred embodiment of the invention for manufacturing duplicate keys from a digitally stored file of a master key.

As illustrated in the accompanying drawing, the present invention comprises a key making method for fabricating one or more keys from stored data obtained previously from a master key. The invention generally comprises the steps of imaging the surface contours of a master key, converting the received image into an electronic representation, and using the electronic representation to manufacture a duplicate key without the use of key blanks. The following description describes preferred and alternative methods of effectuating these steps.

With reference to FIG. 1, an exterior surface conformation of a master key 10 is captured as an electrical signal representation using a scanning unit 100. Alternatively, the signal representation may be synthesized directly from a software representation of the key conformation. Such a software process is well known in the art, but is not known specifically for key making.

In one form of the invention, the means for capturing the exterior surface conformation of the master key 10 is with a holographic camera 12 or the like. Essentially, the scanning unit comprises a beam emitter 14, typically in the form of a laser, which emits a beam of light onto a series of mirrors 16 and beam splitter(s) 18. The theory behind such light scanners is that light, in a straight line, reflected off of an object, can be viewed at a different angle to reveal the profile conformation of the surface of the object. Either the object is moved or a system of mirrors adjusted to completely scan the object for reading. Typically, an incident beam of light is broken into two or more beams with at least one transmitted beam being used as an illuminating beam for the object and the other beam being used as a reference beam. A signal beam is produced which is intercepted and read by the camera 12 and converted into electronic data 20.

It is also possible to capture the exterior surface conformation of the master key using optical scanning techniques. 3-D Scanners, Ltd. introduced ModelMaker™ in 1996. This scanning system allows highly accurate three-dimensional scanning of very detailed objects using a technique which is described as "laser stripe scanning." The ModelMaker™ uses a scanning principal known as laser triangulation in which a beam of laser light is projected as a stripe onto a three-dimensional object and viewed at an angle using a video camera. The image seen on the screen reveals the contour of the object where the laser light intersects the surface of the object. The results of this approach are also directly useful for cutting duplicate keys, as will be further described herein. The scanning unit 100 may be fabricated and used in accordance with the teachings of U.S. Pat. No. 3,826,555 (Matsumoto) entitled "Holographic Camera for Forming Planar or Volume Holograms", which is incorporated herein by reference.

Other similar scanning units 100 can be used as well. Such scanners also typically use light beams to scan the surface contours of an object and relay this reading to a viewer or imager, such as the camera 12, for electronic processing and creation of an electronic data file. For example, Laser Design Inc. of Minneapolis, Minn., teaches how to scan and capture the outer surface conformation of an object and this is embodied in their Surveyor® 1200 3D Laser Digitizing System. The detailed operation of this machine is proprietary, but it is commercially available and its ability is quite sufficient to produce an electronic data set completely defining a master key. Cyberware, Inc. of Monterey, Calif., also provides such technology in a series of optical scanners such as the Whole Body Scanner Model WB4® or Model 15. The theory of operation and capability of these scanners are described in a set of technical brief filed with this application and which is incorporated herein by reference.

In another form of the invention, it is possible to capture the exterior surface contours of the master key using a mechanical probe. Such probes are well known in the art and typically constitute a series of aligned depth gauges so that surface features may be captured with a level of fidelity limited only by the number and size of the individual gauges and gauge tips. To achieve three-dimensional probing, the linear gauge array is placed into contact with the subject while the subject is rotated about a selected axis. In the case of a common key, rotation about the key's functional axis is preferred. The resulting probe readings are analyzed and stored electronically.

Once the three-dimensional image of the master key 10 has been recorded as an electrical signal 20, it is typically digitized and then stored as a magnetic representation on a magnetic mass storage device 200. For example, the data 20 acquired from the scanning unit 100, e.g. the Surveyor® 1200 machine or from the Cyberware equipment, is stored as an electrical signal representation in a data storage device 200. This may be accomplished using any magnetic storage media for instance, i.e., any common form of magnetic surface domain digital data storage device, such as magnetic tape, discs, CD's, etc., as is well known in the art. The production of these necessary signal representation and its storage are fully compatible since the signal is usually converted into a digital format at the scanning unit 100.

The appropriation of electronic signal data 20 by the scanning unit 100 or other similar means is used to directly drive a key making device 300 for reproducing a duplicate key 22 without the need for a key blank as is currently done in the art. The stored representation 20 of the master key 10 may be utilized for making a duplicate key 22 through the use of several well known raw materials using common fabrication processes. In the invention, a duplicating key construction machine is directed in accordance with the stored electrical signal representation 20 in order to construct the new or duplicate key 22.

A preferred method of constructing the duplicate key 22 is through the use of a stereolithography modeling machine, rapid prototyping machine or other similar three-dimensional construction machines which use a raw material, such as proprietary polymer substances used by AAROFLEX, Inc. Indeed, any adequate three-dimensional model-making substance which is able to construct an operable duplicate key 22 may be utilized such as stereolithographic fluid, photosensitive polymer or the like. This raw material is used for constructing the duplicate key employing the digital representation 20 in the form of CAD/CAM images or other similar input for describing the master key's 10 surface contour. Such images are readily available through the use of the camera of Matsumoto or through the use of three-dimensional optical scanning as has been described and defined above.

In one form the key manufacturing device 300 includes a fused deposition modeling apparatus having a processor for directing a material dispenser of the apparatus according to the stored electrical signal representation 20, which may be altered as necessary for use in this apparatus, to construct the duplicate key 22 in successive layers. The dispenser includes a piezoelectric jet or the like which shoots a series of bursts of thermoplastic filament raw build material or the like at a series of respective target positions according to the electrical signal representation 20 as the dispenser advances along a predetermined path of travel. Each burst is defined by a fire signal which directs the dispenser to eject a plurality of droplets, maintained at just above the melting point of the raw material, in relatively rapid succession so that the raw build material combines at the respective target positions. Spacing between the bursts and clumping of combined raw material is controlled so that the duplicate key 22 is produced as a replicate of the original master key 12.

Techniques as described above for building structurally sound physical parts are known in the prior art, such as the technique, patented by Mr. Bill Masters in 1987, called Ballistic Particle Manufacturing. These techniques are able to produce solid objects constructed of ceramic or metal. Another patent, U.S. Pat. No. 5,555,176 to Menhenneft et al., defines a solids construction method similar to Bill Master's technique, and is incorporated herein by reference. A fused deposition modeling apparatus which can be used is the Stratasys™ Model No. FDM1650. Further similar techniques for fabrication are taught in the following U.S. Pat. Nos. 5,130,064; 5,545,367; and 5,192,469, which are all incorporated herein by reference.

More conventional stereolithography can also be implemented into the key manufacturing device 300. Such rapid prototyping processes are layer-additive in that a software program slices the electrical signal representation 20 (three-dimensional CAD model of the original master key 12) into thin cross-sections or layers. A beam of light, such as an ultraviolet laser beam, traces each layer onto the surface of a vat of liquid photopolymeric material which solidifies when exposed to the ultraviolet light. The layers are typically only about 0.005 to 0.006 inch thick when solidified. The laser hardens the liquid according to the geometry in the electronic representation file. The solidified layer is then lowered into the vat so that another layer of liquid is ready to be exposed to the laser beam. This process is repeated until all of the cross-sections have been built up into a solid replica of the original CAD model of the original master key to create the duplicate key 22, which is removed from the vat.

Alternately, similar three-dimensional CAD images derived from the electrical signal representation 20 can be used for producing molds for small parts in automatic processes from a computer driven three-dimensional image. Such molds are used in injection, centrifugal and blow molding techniques for making parts quickly and automatically.

Further, a material removal method such as mechanical milling, laser cutting or electron beam cutting of an appropriate metal or non-metal blank, which is not a traditional key blank, may also be employed. The raw material blank is manipulated so as to allow the cutting device to remove material selectively. The means by which such takes place is currently available as software programs in widespread use in the machine tool industry, typically referred to as computer aided manufacturing (CAM).

In all cases, a three-dimensional computer driven image is used to control the cutting or forming manufacturing device. The methods summarized above illustrate several different embodiments, but each of the embodiments functionally is able to achieve the objectives of the present invention, albeit with time and cost efficiency differences. The methods all follow the same basic steps of imaging the original master key 12, creating and if necessary storing an electrical signal representation 20, and directing a key manufacturing device 300 to create a duplicate key 22 without the use of a traditional key blank.

It will be noted that it is not necessary to have the master key 10 in order to produce a duplicate 22, but only the necessary data representation of the master key 20 as might have been generated by scanning the master key 10, as described above, at some time in the past.

Although the master key 10 itself may be used to create the duplicate key 22, in fact, the optimal approach is to produce duplicate keys 22 from the signal representation 20 only. Current mass production of automobile keys is accomplished by a computer program directing cutting operations relative to a given and existing, key blank so that relatively few variables are being controlled and modified form one key cutting step to the next by the program. In the present case, all aspects or variables of a key's physical conformation are available for control and modification.

Ideally, when a master key 10 is produced, its signal representation is stored and made available commercially. When a duplicate 22 is required the owner of the key need only identify him/herself to a key code bank which could be available on a network, such as the Internet for instance. When proper identification is made, the code is downloaded to a computer associated with the key manufacturing device 300 which then fabricates the duplicate key 22. This approach also avoids generation degradation due to key duplications from duplicates, etc. Such a system could be implemented wherein a consumer inputs the code into a free-standing key manufacturing device 300 which using the electrical signal representation based on the code produces a duplicate key 22 without the need of presenting an original master or duplicate key for copying.

Furthermore, use of the present invention eliminates the need for grinding machines, the acquisition and storage of hundreds of different key blanks, as well as the training necessary to correctly identify the proper key blank and use the grinding machine to duplicate the key as is currently needed.

Although several embodiments have been described in detail for purposes of illustration, various modifications may be made without departing from the scope and spirit of the invention. Accordingly, the invention is not to be limited, except as by the appended claims.

What is claimed is:

1. A key manufacturing method for making a duplicate key from profile data associated with a master key, the method comprising the steps of:

capturing an exterior surface conformation of a master key as an electrical signal representation in three-dimensions;

storing the electrical signal representation as a permanent data image; and directing a key manufacturing device to construct a duplicate key from non-traditional key blank raw material using the stored electrical signal representation.

2. The method of claim 1, wherein the capturing step employs an optical scanning method.

3. The method of claim 2, wherein the capturing step includes the step of using a holographic camera.

4. The method of claim 1, wherein the capturing step employs a mechanical probe.

5. The method of claim 1, wherein the directing step includes the step of directing a three-dimensional modeling device to construct the duplicate key.

6. The method of claim 5, wherein the directing step includes the step of fused deposition modeling.

7. The method of claim 6, wherein the raw material used to construct the key comprises thermoplastic filament.

8. The method of claim 5, wherein the directing step employs a stereolithographic device.

9. The method of claim 8, wherein the raw material used to construct the key is a stereolithographic fluid.

10. The method of claim 1, wherein the directing step includes the step of directing a milling device to construct a duplicate key from a metal slug.

11. The method of claim 1, wherein the directing step includes the step of directing a high energy beam device for preferentially removing material from a metal slug in accordance with a moving high energy beam and a dwelling program using the stored electrical signal representation.

12. The method of claim 1, wherein the directing step includes the step of directing an injection molder device using high density molding resin to construct the duplicate key.

13. The method of claim 1, including the step of assigning a code to the electrical signal representation and storing the electrical signal representation on a database for later retrieval.

14. A key manufacturing method for making a duplicate key from profile data associated with a master key, the method comprising the steps of:

capturing an exterior surface conformation of a master key as an electrical signal representation in three-dimensions using an optical scanner;

storing the electrical signal, representation as a permanent data image; and directing a key manufacturing device comprising a three-dimensional modeling device to construct a duplicate key using the stored electrical signal representation.

15. The method of claim 14, wherein the capturing step includes the step of using a holographic camera.

16. The method of claim 14, wherein the directing step includes the step of fused deposition modeling which uses thermoplastic filament to construct the duplicate key.

17. The method of claim 14, wherein the directing step employs a stereolithographic device using a stereolithographic fluid to construct the duplicate key.

18. The method of claim 14, including the step of assigning a code to the electrical signal representation and storing the electrical signal representation on a database for later retrieval.

19. The method of claim 14, including the step of constructing the duplicate key from non-traditional key blank raw material.

20. A key manufacturing method for making a duplicate key from profile data associated with a master key, the method comprising the steps of:

capturing an exterior surface conformation of a master key as an electrical signal representation in three-dimensions using an optical scanner;

storing the electrical signal representation as a permanent data image; and directing a three-dimensional modeling device comprising a fused deposition modeling device to construct a duplicate key from thermoplastic filament using the stored electrical signal representation.

21. The method of claim 20, including the step of assigning a code to the electrical signal representation and storing the electrical signal representation on a database for later retrieval.

* * * * *